D. WARREN.
Plow-Cleaner.
No. 7,640.
Patented Sept. 10, 1850.
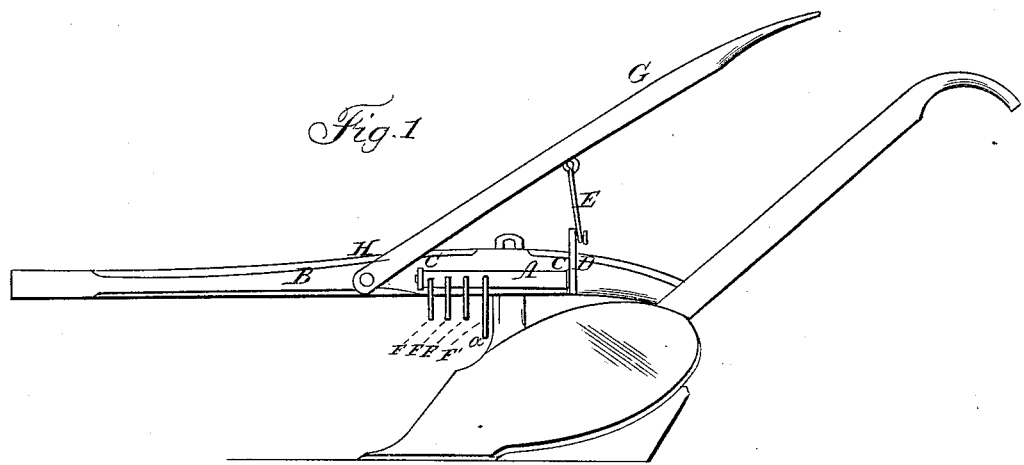
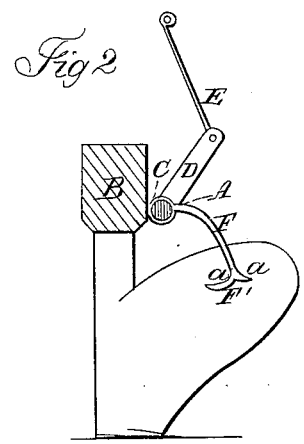
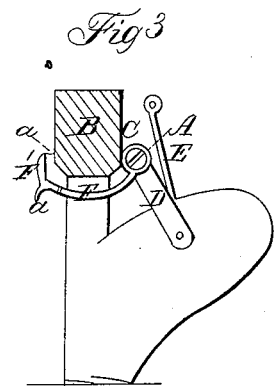

UNITED STATES PATENT OFFICE.

DAVID WARREN, OF GETTYSBURG, PENNSYLVANIA.

IMPROVEMENT IN PLOW-CLEANERS.

Specification forming part of Letters Patent No. 7,640, dated September 10, 1850.

*To all whom it may concern:*

Be it known that I, DAVID WARREN, of Gettysburg, in the county of Adams and State of Pennsylvania, have invented a certain new and useful Improvement in Plow - Clearers, which I denominate the "Vibrating Finger-Clearer;" and I do hereby declare that the following is a full and clear description thereof, reference being had to the drawings hereunto annexed and making part of this specification.

Figure 1 is an elevation of the furrow side of the plow, showing the hand-lever of the clearer elevated. Fig. 2 is a cross-section at the front of the same, showing the clearer turned up or opened. Fig. 3 is same, the clearer being turned beneath the beam.

Similar letters on the figures refer to the same parts.

The nature of my improvement consists in combining with any common plow a vibrating finger-clearer arranged in such a manner in relation to the throat or sheth of the plow that by the simple use of the hand of the plowman to elevate and depress a lever a series of fingers will be made to vibrate back and forth adjacent to the sheth and clear away straw, stubble, or other obstructions which may accumulate around the sheth of the plow while it is plowing, thus dispensing with the necessity of stopping the team to relieve the plow, which in foul and weedy land would frequently occur, consuming much time and tending greatly to embarrass the plowman.

To obviate these difficulties my improvement is designed.

The several parts of the plow are made and arranged in the usual or most approved manner.

This clearer consists of a short turning shaft or bar, A, secured horizontally to the beam B of the plow by two projecting ears or plates, C C, and having on its inner end a crank, D, to which is attached a connecting-rod, E. From this shaft or bar A also projects a series of curved fingers or bars, F, in such a manner that when said shaft or bar A is turned by the action of the crank D the fingers or bars F will be made to vibrate beneath the beam and directly in front of the sheth of the plow. The finger or bar F' vibrating nearest to the sheth is provided with two hook - shaped branches, *a a*, at its end, which are made sharp in order to cut away stubble and other obstructions as it opens and closes.

G is a hand-lever, secured to the beam B by a bolt, H, near the outer end of the turning shaft or bar A, and extending upward to within reach of the right hand of the plowman. To this hand-lever is attached the connecting-rod E, which is fastened to the outer end of the crank D.

The turning shaft or vibrating finger-bar is attached to the beam next to the furrow side of the plow. The fingers or bars F, when closed, lie beneath the beam, as seen in Fig. 3.

When it is desired to clear the obstructions from the throat or sheth of the plow during its motion the plowman with his right hand grasps the handle of the lever G and elevates and depresses the same quickly, which will cause the fingers or bars F to vibrate at right angles to the land side of the plow at each movement of the hand-lever by the attachment of the connecting-rod E to the crank D of the turning bar A, and thus cut away the grass, weeds, roots, and other obstructions from around the sheth while the plow is progressing and thus the plow is kept free from choking and much time saved in plowing.

This clearer, as an appendage to the plow, is simple, cheap, and effective, and is applicable to any ordinary plow in use.

Having thus described the construction and use of my improvement on the plow, what I claim as my invention, and desire to have secured to me by Letters Patent, is—

The combination of the vibrating finger-clearer with the beam and sheth of the plow, said finger-clearer being arranged in such a manner in relation to the sheth or throat of the plow that by the use of the hand of the plowman to elevate and depress a lever a series of curved or straight fingers will be made to vibrate back and forth adjacent to the sheth and clear away straw, stubble, and other obstructions therefrom, as described and set forth.

In testimony whereof I have hereunto signed my name before two subcribing witnessses.

DAVID WARREN.

Witnesses:
ROBERT G. HARPER,
H. B. DANNER.